Patented June 11, 1940

2,203,700

UNITED STATES PATENT OFFICE 2,203,700

PREPARATION OF CELLULOSE ESTERS OF HIGH ACYL VALUE

George W. Seymour and Blanche B. White, Cumberland, Md., assignors to Celanese Corporation of America, a corporation of Delaware No Drawing. Application February 28, 1939, Serial No. 258,950

13 Claims. (Cl. 260—227)

This invention relates to the process of preparing organic esters of cellulose, and relates more particularly to the production of organic esters of cellulose of high acyl value having improved solubility and other properties.

An object of this invention is the economic and expeditious preparation of a stable organic ester of cellulose of high acyl value that is soluble in acetone and has a reduced viscosity.

Another and specific object of this invention is the production of cellulose acetate having an acetyl value above 55%, calculated as acetic acid, which is soluble in acetone and has a viscosity between 1.2 and 14.1.

Other objects of this invention will appear from the following detailed description and claims.

In the process of preparing organic esters of cellulose, the esterification of cellulose is usually carried out by treating cellulose with an organic acid anhydride in the presence of an organic acid diluent or solvent for the ester of cellulose being formed and a catalyst such as sulphuric acid. After completion of the esterification of the cellulose, there results a homogeneous viscous solution and water may then be added in amounts sufficient to convert any organic acid anhydride remaining into the corresponding acid, whereupon usually after the addition of a certain quantity of water, the cellulose ester is permitted to hydrolyze or ripen to develop the desired solubility characteristics. Water and/or other non-solvent for the cellulose ester may then be added in sufficient amounts to precipitate the cellulose ester from solution. The cellulose ester is then washed and/or distilled to free it of acids as much as possible.

The present invention may be employed in the making of any suitable organic ester of cellulose such as cellulose formate, cellulose acetate, cellulose propionate and cellulose butyrate. Cellulose in any suitable form, such as cotton, cotton linters, wood pulp made by either the sulphite or soda process, reconstituted cellulose, etc. may be employed in making the cellulose esters. The cellulose may be activated by pretreatment with lower aliphatic acids, etc. The esterifying agent may be formic acid, acetic anhydride, propionic anhydride or butyric anhydride depending upon the ester to be formed. The esterification may be carried out in the presence of a suitable catalyst such as sulphuric acid, sodium bisulphate, methyl sulphate or a mixture of these with each other or with other catalysts such as zinc chloride. However, for the sake of simplicity this invention will be described in connection with the preparation of cellulose acetate which is at the present time commercially the most important of the cellulose esters.

Thus, in preparing cellulose acetate by the prior process such as outlined above for the preparation of cellulose esters, cellulose is acetylated by treatment with acetic anhydride and a catalyst, such as sulphuric acid, in the presence of glacial acetic acid as a solvent for the cellulose acetate that is formed. After completion of the acetylation, the resulting solution of cellulose acetate in glacial acetic acid is ripened and then treated with a large excess of water or other non-solvent to precipitate the cellulose acetate. After precipitation the cellulose acetate may be washed with water to remove as much acid and other non-cellulose ester ingredients of the acetylation mixture as possible.

The cellulose acetate so formed has an acetyl value between 53 and 54.5%, calculated as acetic acid, has a viscosity above 15 and contains sulphur in the form of various compounds which impair the stability of the cellulose acetate and impart thereto the tendency to decompose, degrade and/or discolor. There may also be formed cellulose derivatives that tend to decompose and break down in the presence of the sulphur compounds.

In accordance with the process of this invention the primary solution of the cellulose acetate is treated to remove the sulphur compounds and the unstable compounds or to convert the same into non-decomposing or non-deteriorating compounds. By the method of this invention the cellulose acetate is made more stable, has an acetyl value above 55%, calculated as acetic acid, is soluble in acetone and has a reduced viscosity.

In accordance with this invention, we produce a cellulose acetate having the above noted characteristics by precipitating the cellulose acetate directly from the original primary solution by arresting the acetylation at or near that point at which the cellulose acetate has the highest acetyl value and adding to the solution a metallic salt, such as magnesium chloride and zinc chloride, in an amount equivalent to the quantity of sulphuric acid originally employed as catalyst. Water is then added in a quantity sufficient to convert the acetic anhydride to acetic acid plus an additional quantity amounting to from 6 to 12 parts of water for each 100 parts of cellulose acetate in the solution. The cellulose acetate is then allowed to ripen for about 48 hours at 18 to 30° C., and then it is precipitated in any suitable manner.

The amount of water employed in excess of the amount required to convert the acetic anhydride to acetic acid is of importance for it is not until the quantity of water reaches about 6 parts per 100 parts of cellulose acetate that high acetone-solubility of the cellulose acetate accompanied by a fair stability is obtained. With this addition of the limited amount of water the acetyl value of the cellulose acetate varies between 58 and 60%, calculated as acetic acid, after about 48 hours of ripening at 18 to 30° C. When water is added in an amount greater than 12 parts per 100 parts of cellulose acetate the decrease of acetyl value appears to be fairly rapid so that while a moderately stable cellulose acetate of satisfactory acetone-solubility is obtained, the acetyl value thereof is no longer as high as is desired. In the present process we prefer to employ 6 parts of water for each 100 parts of cellulose acetate present in the solution.

As illustrations of our invention but without being limited thereto, the following examples are given.

Example I 170 parts of cotton are acetylated with 630 parts of acetic acid, 358 parts of acetic anhydride and 23.5 parts of sulphuric acid, the acetylation being effected for 1.5 hours with peak temperature of 42° C. To the solution are then added, with stirring, 22.4 parts of magnesium chloride and 20.9 parts of water, or about 7 parts of water per 100 parts of cellulose acetate present in the solution. The dope is allowed to stand 48 hours at 18–27° C. The cellulose acetate is precipitated in fibrous form. It has an acetyl value of 57.5–58.4, and a viscosity of 9–10. It is stable to heat and boiling and soluble in acetone.

Example II 170 parts of cotton are acetylated with 630 parts of acetic acid, 358 parts of acetic anhydride and 23.5 parts of sulphuric acid, the acetylation being effected for 1.5 hours with peak temperature of 42° C. To the solution is then added, with stirring, 135 parts zinc chloride and 20.9 parts of water, or about 7 parts of water per 100 parts of cellulose acetate present in the solution. The dope is allowed to stand 48 hours at 18–27° C. The cellulose acetate is precipitated in fibrous form. It has an acetyl value of 57.5–58.4. It is stable to heat and boiling and soluble in acetone. It is of lower viscosity than the cellulose acetate produced in accordance with Example I.

The viscosity of the ripened cellulose acetate is determined by comparing the rate of flow of a 6% solution thereof in pure acetone at a temperature of 60° F. with a rate of flow of pure glycerine under like conditions, the rate of flow of the glycerine being taken as 100.

It is to be understood that the foregoing detailed description is merely given by way of illustration and that many variations may be made therein without departing from the spirit of our invention.

Having described our invention, what we desire to secure by Letters Patent is:

1. Process for the manufacture of cellulose esters of high acyl value characterized by being of reduced viscosity and soluble in acetone, which comprises adding to the primary solution containing the cellulose ester, the excess anhydride employed in the esterification process and an acid catalyst, a metallic salt in an amount equivalent to the quantity of acid employed as catalyst, adding water in an amount just sufficient to convert the anhydride to the acid, and an excess of water of from 6 to 12 parts for every 100 parts of ester in the solution, permitting the cellulose ester to ripen at a low temperature, and precipitating the cellulose ester from the solution.

2. Process for the manufacture of cellulose acetate of high acetyl value characterized by being of reduced viscosity and soluble in acetone, which comprises adding to the primary solution containing the cellulose acetate, the excess acetic anhydride employed in the acetylation process and an acid catalyst, a metallic salt in an amount equivalent to the quantity of acid employed as catalyst, adding water in an amount just sufficient to convert the acetic anhydride to acetic acid, and an excess of water of from 6 to 12 parts for every 100 parts of cellulose acetate in the solution, permitting the cellulose acetate to ripen at a low temperature, and precipitating the cellulose acetate from the solution.

3. Process for the manufacture of cellulose esters of high acyl value characterized by being of reduced viscosity and soluble in acetone, which comprises adding to the primary solution containing the cellulose ester, the excess anhydride employed in the esterification process and an acid catalyst comprising sulphuric acid or a derivative thereof, a metallic salt of which the metal is available in sufficient amount to combine with the quantity of said sulphuric acid or derivative thereof employed as catalyst, adding water in an amount just sufficient to convert the anhydride to the acid, and an excess of water of from 6 to 12 parts for every 100 parts of ester in the solution, permitting the cellulose ester to ripen at a temperature of from 18 to 30° C., and precipitating the cellulose ester from the solution.

4. Process for the manufacture of cellulose acetate of high acetyl value characterized by being of reduced viscosity and soluble in acetone, which comprises adding to the primary solution containing the cellulose acetate, the excess acetic anhydride employed in the acetylation process and an acid catalyst comprising sulphuric acid or a derivative thereof, a metallic salt of which the metal is available in sufficient amount to combine with the quantity of said sulphuric acid or derivative thereof employed as catalyst, adding water in an amount just sufficient to convert the acetic anhydride to acetic acid, and an excess of water of from 6 to 12 parts for every 100 parts of cellulose acetate in the solution, permitting the cellulose acetate to ripen at a temperature of from 18 to 30° C., and precipitating the cellulose acetate from the solution.

5. Process for the manufacture of cellulose esters of high acyl value characterized by being of reduced viscosity and soluble in acetone, which comprises adding to the primary solution containing the cellulose ester, the excess anhydride employed in the esterification process and an acid catalyst comprising sulphuric acid or a derivative thereof, a metallic salt of which the metal is available in sufficient amount to combine with the quantity of said sulphuric acid or derivative thereof employed as catalyst, adding water in an amount just sufficient to convert the anhydride to the acid, and an excess of water, of from 6 to 12 parts for every 100 parts of ester in the solution, permitting the cellulose ester to ripen at a temperature of from 18 to 30° C. for 48 hours, and precipitating the cellulose ester from the solution.

6. Process for the manufacture of cellulose acetate of high acetyl value characterized by being of reduced viscosity and soluble in acetone, which comprises adding to the primary solution containing the cellulose acetate, the excess acetic anhydride employed in the acetylation process and an acid catalyst comprising sulphuric acid or a derivative thereof, a metallic salt of which the metal is available in sufficient amount to combine with the quantity of said sulphuric acid or derivative thereof employed as catalyst, adding water in an amount just sufficient to convert the acetic anhydride to acetic acid, and an excess of water of from 6 to 12 parts for every 100 parts of cellulose acetate in the solution, permitting the cellulose acetate to ripen at a temperature of from 18 to 30° C. for 48 hours, and precipitating the cellulose acetate from the solution.

7. Process for the manufacture of cellulose esters of high acyl value characterized by being of reduced viscosity and soluble in acetone, which comprises adding to the primary solution containing the cellulose ester, the excess anhydride employed in the esterification process and an acid catalyst comprising sulphuric acid or a derivative thereof, a metallic salt of which the metal is available in sufficient amount to combine with the quantity of said sulphuric acid or derivative thereof employed as catalyst, adding water in an amount just sufficient to convert the anhydride to the acid and an excess of water of 6 parts for every 100 parts of ester in the solution, permitting the cellulose ester to ripen at a low temperature, and precipitating the cellulose ester from the solution.

8. Process for the manufacture of cellulose acetate of high acetyl value characterized by being of reduced viscosity and soluble in acetone, which comprises adding to the primary solution containing the cellulose acetate, the excess acetic anhydride employed in the acetylation process and an acid catalyst comprising sulphuric acid or a derivative thereof, a metallic salt of which the metal is available in sufficient amount to combine with the quantity of said sulphuric acid or derivative thereof employed as catalyst, adding water in an amount just sufficient to convert the acetic anhydride to acetic acid, and an excess of water of 6 parts for every 100 parts of cellulose acetate in the solution, permitting the cellulose acetate to ripen at a low temperature, and precipitating the cellulose acetate from the solution.

9. Process for the manufacture of cellulose esters of high acyl value characterized by being of reduced viscosity and soluble in acetone, which comprises adding to the primary solution containing the cellulose ester, the excess anhydride employed in the esterification process and an acid catalyst comprising sulphuric acid or a derivative thereof, a metallic chloride of which the metal is available in sufficient amount to combine with the quantity of said sulphuric acid or derivative thereof employed as catalyst, adding water in an amount just sufficient to convert the anhydride to the acid and an excess of water of 6 parts for every 100 parts of ester in the solution, permitting the cellulose ester to ripen at a low temperature, and precipitating the cellulose ester from the solution.

10. Process for the manufacture of cellulose acetate of high acetyl value characterized by being of reduced viscosity and soluble in acetone, which comprises adding to the primary solution containing the cellulose acetate, the excess acetic anhydride employed in the acetylation process and an acid catalyst comprising sulphuric acid or a derivative thereof, a metallic chloride of which the metal is available in sufficient amount to combine with the quantity of said sulphuric acid or derivative thereof employed as catalyst, adding water in an amount just sufficient to convert the acetic anhydride to acetic acid, and an excess of water of 6 parts for every 100 parts of cellulose acetate in the solution, permitting the cellulose acetate to ripen at a low temperature and precipitating the cellulose acetate from the solution.

11. Process for the manufacture of cellulose esters of high acyl value characterized by being of reduced viscosity and soluble in acetone, which comprises adding to the primary solution containing the cellulose ester, the excess anhydride employed in the esterification process and an acid catalyst comprising sulphuric acid or a derivative thereof, a substance selected from the group consisting of magnesium chloride and zinc chloride of which the magnesium or zinc is available in sufficient amount to combine with the quantity of said sulphuric acid or derivative thereof employed as catalyst, adding water in an amount just sufficient to convert the anhydride to the acid and an excess of water of 6 parts for every 100 parts of ester in the solution, permitting the cellulose ester to ripen at a low temperature, and precipitating the cellulose ester from the solution.

12. Process for the manufacture of cellulose acetate of high acetyl value characterized by being of reduced viscosity and soluble in acetone, which comprises adding to the primary solution containing the cellulose acetate, and excess acetic anhydride employed in the acetylation process and an acid catalyst comprising sulphuric acid or a derivative thereof, a substance selected from the group consisting of magnesium chloride and zinc chloride of which the magnesium or zinc is available in sufficient amount to combine with the quantity of said sulphuric acid or derivative thereof employed as catalyst, adding water in an amount just sufficient to convert the acetic anhydride to acetic acid, and an excess of water of 6 parts for every 100 parts of cellulose acetate in the solution, permitting the cellulose acetate to ripen at a low temperature and precipitating the cellulose acetate from the solution.

13. Process for the manufacture of cellulose acetate having an acetyl value of 55%, calculated as acetic acid characterized by having a viscosity of below 15 and being soluble in acetone, which comprises adding to the primary solution containing the cellulose acetate, the excess acetic anhydride employed in the acetylation process and an acid catalyst comprising sulphuric acid or a derivative thereof, a substance selected from the group consisting of magnesium chloride and zinc chloride of which the magnesium or zinc is available in sufficient amount to combine with the quantity of said sulphuric acid or derivative thereof employed as catalyst, adding water in an amount just sufficient to convert the acetic anhydride to acetic acid, and an excess of water of 6 parts for every 100 parts of cellulose acetate in the solution, permitting the cellulose acetate to ripen at a low temperature and precipitating the cellulose acetate from the solution.

GEORGE W. SEYMOUR.
BLANCHE B. WHITE.